United States Patent
Hamburg et al.

[11] Patent Number: 6,084,684
[45] Date of Patent: Jul. 4, 2000

[54] TRAP WITH DISTRIBUTION FOR ARBITRARY INKS

[75] Inventors: Mark Hamburg, Scotts Valley, Calif.; John P. Felleman, Mercer Island, Wash.; Thomas F. Knoll, Ann Arbor, Mich.

[73] Assignee: Adobe Systems Incorporated, San Jose, Calif.

[21] Appl. No.: 09/007,969

[22] Filed: Jan. 16, 1998

[51] Int. Cl.$^7$ .................................................. G06F 19/00
[52] U.S. Cl. .......................... 358/1.09; 358/515; 358/532; 382/256; 348/666
[58] Field of Search ........................... 395/109; 358/515, 358/532; 382/256; 348/666

[56] References Cited

PUBLICATIONS

Lawler, "The Complete Guide to Trapping", 2d Edition, copyright 1995.
Adobe Systems Incorporated, "Adobe PostScript 3, Rules for In–RIP Trapping", Nov. 18, 1997.
Imation Corp., "Using TrapWise", copyright 1977, 5 pages.
Adobe PostScript 3's Rules for In–RIP Trapping, Nov. 1997.
Lawler, "The Complete Guide to Trapping", 2d Edition, 1995.

*Primary Examiner*—Mark R. Powell
*Assistant Examiner*—Lance W. Sealey
*Attorney, Agent, or Firm*—Fish & Richardson P.C.

[57] ABSTRACT

Methods and apparatus for determining the allocation of a trap width to the spread of a pair of inks in printing. Allocation of the spread is based on both a solidity value that may be between zero and one and a lightness value. The technique may be applied to an arbitrary number of inks by considering each pair of inks separately.

27 Claims, 1 Drawing Sheet

TRAP WITH DISTRIBUTION FOR ARBITRARY INKS

BACKGROUND OF THE INVENTION

The present invention relates to apparatus and methods for generating traps in digital document preparation or prepress operations.

A page in an electronic document may include various types of objects, including text, line art, and images. Electronic documents are generally created by computer programs (also called application programs or simply applications) that may be executed by a user on a computer to create and edit electronic documents and to produce (directly or indirectly) printed output defined by the documents. Such programs include the Adobe Illustrator® and Photoshop® products, both available from Adobe Systems Incorporated of San Jose, Calif. Objects in electronic documents may be represented in vector form, raster form, or in hybrid forms.

A color page in an electronic document includes information about the colors used in the page. Colors are defined in accordance with a "color space", which provides a data representation of a range of colors in terms of basic color components. The specific color components will vary depending on the color system used. For example, in the CMYK color system, colors are represented as combinations of cyan (C), magenta (M), yellow (Y), and black (or "key") (K).

To create a physical page printed with inks, data representations of colors are used to create color separations. This is general done by computer programs running on general or special purpose systems. Generally, each color separation used by an output device will correspond to a color component of the color system used by the device. For example, data representations of colors in output generated for an imagesetter using a CMYK color system will be used to create color separations for cyan, magenta, yellow, and black, with each separation indicating regions where the corresponding ink should be applied, as well as the amount of ink that should be applied.

Misregistration or inaccuracies in the physical placement of two or more colors with respect to each other on a printed sheet in printing can cause unintentional gaps or overlaps at edges of color regions on an output page. Misregistration may occur for a variety of reasons relating to the performance of people, machines, and materials.

To minimize the effects of misregistration, a technique known as trapping adjusts the shapes of color regions by spreading (expanding) some color regions to prevent gaps, and choking (contracting) other color regions to prevent overlaps. The adjusted areas into which inks will be spread or from which inks will be contracted are referred to as "trap regions", and trapping also entails determination of the amount of ink to be applied to the trap regions for each affected separation.

In the case of a spread, the amount of spread desired for a particular printing job may generally be set to a value—the trap width—specific for the job in view of the specific paper, inks, press, and required quality of the job. Whether any spreading occurs at all at a particular location for one ink with respect to another ink is determined separately, and depends, among other things, on whether the other ink is present at the location. When it has been determined that spreading is to occur, there remains the question of how to allocate the trap width is between the two colors.

SUMMARY OF THE INVENTION

In general, in one aspect, the invention provides a technique for determining the allocation of a trap width to the spread of a pair of inks. The technique allocates the spread based on both a solidity value that may be between zero and one and a lightness value. The technique may be applied to an arbitrary number of inks by considering each pair of inks separately.

In general, in another aspect, in a system for preparing an electronic document for printing with a plurality of inks applied to a corresponding plurality of separation plates in a print order, the invention provides methods and apparatus implementing a technique for determining an amount of spread of a first ink on a first plate with reference to a second ink on a second plate. The technique includes obtaining a trap width, identifying one of the first and second inks as the upper ink according to the print order of the inks and the other ink as the lower ink, obtaining a lightness value LU for the upper ink, obtaining a lightness value LL for the lower ink, obtaining a solidity value SU for the upper ink, and computing an upper factor UF for the upper-lower ink pair in accordance with the definition $UF=(1-SU) \times LU/(LL+LU)$. Advantageous implementations of the technique include one or more of the following features. Parameters to control operation of a trapping process are derived from the upper factor. An upper ink spread for the upper ink and a lower ink spread for the lower ink are computed from the upper factor UF and the trap width. An upper keepaway distance for the upper ink and a lower keepaway distance for the lower ink are computed from the upper factor UF and the trap width. The upper ink spread US is computed in accordance with the definition $US=TW \times UF$ and the lower ink spread LS is computed in accordance with the definition $LS=TW-US$. A non-decreasing function f is applied to the upper factor UF before UF is used to compute the upper ink spread and the lower ink spread, f being defined over the possible values of UF and having $f(0)=0$ and $f(1)=1$. The lightness values LU and LL are calorimetric luminance values. The lightness values LU and LL are neutral density values. The lightness values LU and LL are selected by a user from a predetermined set of distinct values. The upper ink is a spot color having a solidity value SU greater than zero and less than one. Computing an upper factor is performed for each pair of upper-lower inks in the print order for a single trap width value; and at least one of the inks in the print order has a solidity value greater than zero and less than one.

In general, in another aspect, the invention provides methods and apparatus implementing a technique for preparing an image for printing with multiple inks having a print order defining an upper-lower order between each two-ink pair of inks. The techniques includes obtaining a single trap width; and for each upper-lower pair of inks, computationally allocating the trap width between the two inks in the pair, the allocation defining an amount of spread for each ink in the context of the other ink in the pair, the sum of the amounts of spread for each pair being the trap width, whereby the same trap width is used to define the amount of spread for all inks in the print order. Advantageous implementations of the technique include one or more of the following features. At least one of the inks is a spot ink that is neither fully transparent nor fully opaque.

Among the advantages of the invention are one or more of the following. Traps can automatically be adjusted according to fractional (rather than merely binary) solidity values of inks. The technique produces good results with inks that are not fully transparent or fully opaque. The technique allows spot colors to be trapped automatically. (Spot colors, also called custom colors, are printed using pre-mixed inks, rather than reproduced by mixing cyan, magenta, yellow, and black (CMYK) inks. In printing, each spot color requires its own separation plate, which is coated with the pre-mixed ink.) Use of the technique allows a user to specify one trap width for a printing job rather than having to specify a trap width or a pair of spreads for each pair of inks. Use of the technique allows a system to accept a lightness value for a color from a user and to use the provided value in calculating traps.

Other features and advantages of the invention will become apparent from the following description and from the claims.

DETAILED DESCRIPTION

Figure 1:
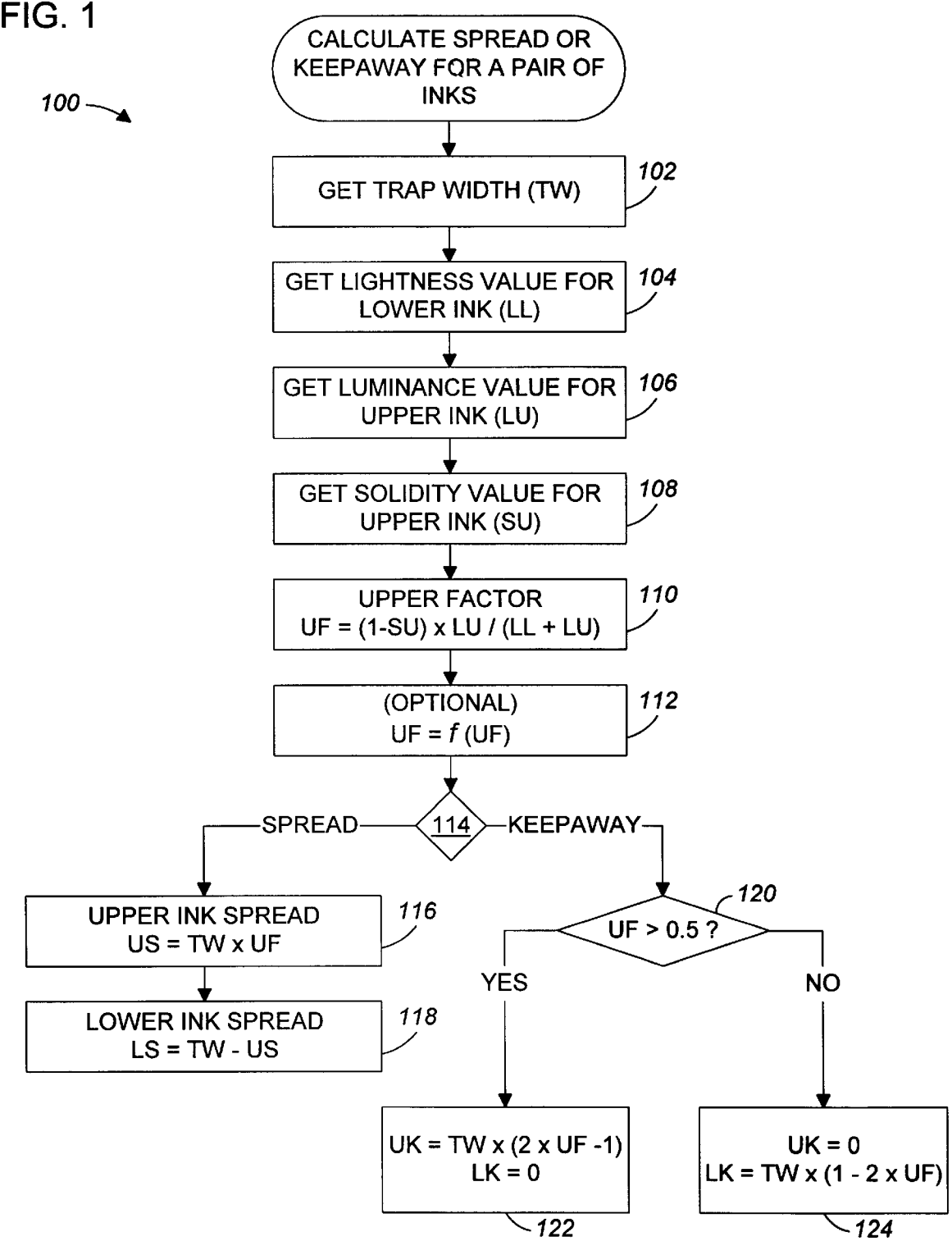
FIG. 1 is a flowchart of a method of allocating a spread width or a keepaway width for an upper and lower ink in accordance with the invention.

Referring to FIG. 1, a method 100 may be implemented in a document processing system to determine how to distribute the inks of a pair of trapped color separations, that is, to calculate the amount of spread or keepaway for an arbitrary pair of inks. In accordance with method 100, the system obtains the following information, in any order: a trap width TW (step 102), which may be obtained interactively from a user or defined as a document or system specific parameter; a lightness value LL for the lower ink (step 104) and LU for the upper ink (step 106); and a solidity value SU for the upper ink (step 108). The lower ink is the ink of the separation that is printed before (and hence is under or "lower") the other separation of the pair (which therefore is "upper").

Lightness values can be measured using any scale that provides non-negative values. It is, of course, advantageous for colors that perceived as lighter to have higher lightness values than those perceived to be darker. For example, any non-decreasing function of the L* value for the CIE (Commission Internationale de l'Eclairage) L*a*b* representation of an ink color will provide an acceptable lightness function. Similarly, a calorimetric luminance or a neutral density would also provide suitable lightness values. Neutral density is a well-known measure of the amount of white light captured by an ink and ranges in value from zero to one, inclusive. While luminance is a measure of the visual appearance of an ink as printed, neutral density is a measure of the energy transmissible through the ink as printed. If it is desired that a black ink not be spread, the ink should be assigned a lightness of zero. For user convenience, a system may allow a user to group or assign colors to a small group of categories for trapping purposes, such as dark, medium, and light, with lightness values 0, 0.5, and 1.

A solidity value characterizes the physical behavior of an ink and quantifies the extent to which an ink covers the inks below it and ranges in value from zero to one, inclusive. An ink having a solidity of 1.0 is fully opaque: one cannot see through it when it is printed and colors printed below it are essentially irrelevant. Acrylic paint is an example of an ink with a solidity near 1.0. An ink having a solidity of 0.0 is transmissive and although it filters colors printed below it, one can see them. A watercolor glaze or standard process color inks are examples of inks that are more transmissive than solid. No specific standard for calculating solidity has been established and method 100 does not require one, it merely requires a parameter that reflects the range of effects just described.

Having the necessary data values, the calculation proceeds as follows. An upper factor UF is calculated as $$UF=(1.0-SU) \times LU \div (LL+LU),\qquad\text{(Eq. 1)}$$

where SU is the solidity of the upper ink; LU is the lightness of the upper ink; and LL is the lightness of the lower ink (step 110). If both LL and LU are zero, the term LU÷(LL+LU) needs special handling to avoid division by zero. It may be replaced by a predetermined or dynamically determined constant: using 0.5 will cause even spreading; using 0.0 will cause only the lower color to be spread. A non-decreasing function f on the domain [0, 1] may optionally be applied to the factor UF, with f(0)=0 and f(1)=1 (step 112). By defining such a function f to have a range of three values {0, 0.5, and 1}, for example, spreading can be restricted to one of three effects: not spreading the upper ink at all; spreading upper and lower inks equally; and spreading only the upper ink.

If an amount of spread for the upper and lower inks is to be calculated (the spread branch of decision step 114), the spread width for the upper ink is calculated as $$US=TW \times UF;\qquad\text{(Eq. 2)}$$

and the spread width for the lower ink is calculated as $$LS=TW-US\qquad\text{(Eq. 3)}$$

(steps 116 and 118), where US is the spread width for the upper ink, LS is the spread width for the lower ink, and TW is the trap width.

If an amount of keepaway for the upper and lower inks is to be calculated (the keepaway branch of decision step 114), the factor UF is tested (decision step 120). If UF is greater than 0.5, the upper ink keepaway is calculated as $$UK=TW \times (2 \times UF-1),\qquad\text{(Eq. 4)}$$

where UK is the upper ink keepaway, and LK, the lower ink keepaway, is zero:

$$LK=0.\qquad\text{(Eq. 5)}$$

If UF is less than 0.5, the calculations are $$UK=0\qquad\text{(Eq. 6)}$$

and $$LK=TW \times (1-2 \times UF).\qquad\text{(Eq. 7)}$$

One advantageous use for method 100 is to generate width parameters for any of a class of trapping algorithms or trapping engines that take as inputs two plates (separations, each for an ink) and a trap width and produce a spread delta plate. The two plates are a spread plate and an into plate, and the engine determines where to spread the spread plate ink to trap with the into plate. The result is a delta plate for the spread-into pair. The spread plate may be either above or below the into plate in the print order. For this use, the method 100 of allocating trap width is applied to all pairs of upper and lower inks. For a spread-into pair, the upper ink spread (US, step 116) is used if the spread plate is above the into plate, and the lower ink spread (LS, step 118) is used if the spread plate is below the into plate. Thus, for printing three inks, the method 100 would in general be applied to three ordered pairs of inks. For printing four inks, the method would in general be applied to six ordered pairs of inks; and for n inks, in general, to n×(n−1)÷2 ordered pairs.

Such an engine produces a delta image for a pair of plates (that is, for a pair of inks), the spread plate and the into plate, based on a spread width input. The delta image shows where ink is to be added to the original spread plate by reason of the original image on the into plate. The spread width input to the engine for the pair of plates is the upper ink spread US as calculated in Equation 2, above, or the lower ink spread LS as calculated in Equation 3, above, depending on whether the spread plate is above or below the into plate, respectively, in the print order. In general, n×(n−1) delta images will be produced.

To determine what spread is to be applied to each plate, the delta images produced by such a trapping engine for each ink are, in substance, or'd together to produce a final delta image defining the spread applied to the plate for the ink. This produces a final delta image that has ink wherever any of the delta images has ink.

In the case of keepaway traps, the accumulation of delta images is complementary to what has been described for spreads, in that the delta images specify where ink is to be taken away from a plate. The keepaway delta images are, in substance, or'd together to produce a final delta image of where ink is to be taken away.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system comprising at least one programmable processor coupled to receive data and instructions from, and to transmit data and instructions to, a data storage system (including volatile and non-volatile memory and/or storage elements), at least one input device, and at least one output device. Each computer program may be implemented in a high-level procedural or object-oriented programming language, or in assembly or machine language, if desired; and in any case, the language may be a compiled or interpreted language. Suitable processors include, by way of example, both general and special purpose microprocessors coupled to a read-only memory and/or a random access memory to receive instructions and data. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Other embodiments are within the scope of the following claims. For example, the order of performing steps of the invention may be changed by those skilled in the art and still achieve desirable results.

What is claimed is:

1. In a system for preparing an electronic document for printing with a plurality of inks applied to a corresponding plurality of separation plates, the inks having a print order, a method of determining an amount of spread of a first ink on a first plate with reference to a second ink on a second plate, the method comprising:

obtaining a trap width;

identifying one of the first and second inks as the upper ink according to the print order of the inks and the other ink as the lower ink;

obtaining a lightness value LU for the upper ink;

obtaining a lightness value LL for the lower ink;

obtaining a solidity value SU for the upper ink;

computing an upper factor UF for the upper-lower ink pair in accordance with the definition UF=(1−SU)×LU/(LL+LU).

2. The method of claim 1, further comprising:

deriving parameters to control operation of a trapping process from the upper factor.

3. The method of claim 2, further comprising:

computing an upper ink spread for the upper ink and a lower ink spread for the lower ink from the upper factor UF and the trap width.

4. The method of claim 2, further comprising:

computing an upper keepaway distance for the upper ink and a lower keepaway distance for the lower ink from the upper factor UF and the trap width.

5. The method of claim 3, wherein:

the upper ink spread US is computed in accordance with the definition US=TW×UF and the lower ink spread LS is computed in accordance with the definition LS=TW−US.

6. The method of claim 5, wherein:

a non-decreasing function f is applied to the upper factor UF before UF is used to compute the upper ink spread and the lower ink spread, f being defined over the possible values of UF and having f(0)=0 and f(1)=1.

7. The method of claim 5, wherein:

the lightness values LU and LL are colorimetric luminance values.

8. The method of claim 5, wherein:

the lightness values LU and LL are neutral density values.

9. The method of claim 5, wherein:

the lightness values LU and LL are selected by a user from a predetermined set of distinct values.

10. The method of claim 5, wherein:

the upper ink is a spot color having a solidity value SU greater than zero and less than one.

11. The method of claim 5, wherein:

the step of computing an upper factor is performed for each pair of upper-lower inks in the print order; and at least one of the inks in the print order has a solidity value greater than zero and less than one.

12. A method of preparing an image for printing with a plurality of inks having a print order defining an upper-lower pair of inks for each two-ink pair of the plurality of inks, the method comprising:

obtaining a respective solidity value for each upper ink;

obtaining a trap width; and for each upper-lower pair of inks, computing an allocation of the trap width between the two inks in the pair using the obtained solidity value for the upper ink, the allocation defining an amount of spread for each ink in the context of the other ink in the pair.

13. The method of claim 12, wherein:
at least one of the inks is a spot ink that is neither fully transparent nor fully opaque.

14. A computer-readable storage medium tangibly embodying a program to determine an amount of spread of a first ink on a first plate with reference to a second ink on a second plate in a system for preparing an electronic document for printing with a plurality of inks applied to a corresponding plurality of separation plates, the inks having a print order, the program comprising instructions operable to cause a programmnable processor to:
obtain a trap width;
identify one of the first and second inks as the upper ink according to the print order of the inks and the other ink as the lower ink;
obtain a lightness value LU for the upper ink;
obtain a lightness value LL for the lower ink;
obtain a solidity value SU for the upper ink; and
compute an upper factor UF for the upper-lower ink pair in accordance with the definition $UF=(1-SU) \times LU/(LL+LU)$.

15. The computer-readable storage medium of claim 14, wherein the program further comprises instructions operable to cause the programmable processor to:
derive parameters to control operation of a trapping process from the upper factor.

16. The computer-readable storage medium of claim 15, wherein the program further comprises instructions operable to cause the programmable processor to:
compute an upper ink spread for the upper ink and a lower ink spread for the lower ink from the upper factor UF and the trap width.

17. The computer-readable storage medium of claim 15, wherein the program further comprises instructions operable to cause the programmable processor to:
compute an upper keepaway distance for the upper ink and a lower keepaway distance for the lower ink from the upper factor UF and the trap width.

18. The computer-readable storage medium of claim 16, wherein the instructions are operable to cause the programmable processor to:
compute the upper ink spread US in accordance with the definition $US=TW \times UF$ and the lower ink spread LS in accordance with the definition $LS=TW-US$.

19. The computer-readable storage medium of claim 18, wherein the instructions are operable to cause the programmable processor to:
apply a non-decreasing function f to the upper factor UF before UF is used to compute the upper ink spread and the lower ink spread, f being defined over the possible values of UF and having $f(0)=0$ and $f(1)=1$.

20. The computer-readable storage medium of claim 18, wherein:
the lightness values LU and LL are calorimetric luminance values.

21. The computer-readable storage medium of claim 18, wherein:
the lightness values LU and LL are neutral density values.

22. The computer-readable storage medium of claim 18, wherein:
the lightness values LU and LL are selected by a user from a predetermined set of distinct values.

23. The computer-readable storage medium of claim 18, wherein:
the upper ink is a spot color having a solidity value SU greater than zero and less than one.

24. The computer-readable storage medium of claim 18, wherein:
the instructions are operable to cause the programmable processor to compute an upper factor for each pair of upper-lower inks in the print order; and
at least one of the inks in the print order has a solidity value greater than zero and less than one.

25. A computer-readable storage medium tangibly embodying a program for use in a system for preparing an image for printing with a plurality of inks having a print order defining an upper-lower pair of inks for each two-ink pair of the plurality of inks, the program comprising instructions operable to cause a programmable processor to:
obtain a respective solidity value for each upper ink;
obtain a trap width; and
for each upper-lower pair of inks, compute an allocation of the trap width between the two inks in the pair using the obtained solidity value for the upper ink, the allocation defining an amount of spread for each ink in the context of the other ink in the pair.

26. The computer-readable storage medium of claim 25, wherein:
at least one of the inks is a spot ink that is neither fully transparent nor fully opaque.

27. The method of claim 12, wherein the sum of the amounts of spread for each pair defines the trap width, whereby the same trap width is used to define the amount of spread for all inks in the print order.

* * * * *